(12) United States Patent
Kato (10) Patent No.: US 9,726,238 B2
(45) Date of Patent: Aug. 8, 2017

(54) OVERLOAD LIMITING DEVICE

(71) Applicant: Techno Dynamics Inc., Kikugawa-shi, Shizuoka (JP)

(72) Inventor: Toshinao Kato, Kikugawa (JP)

(73) Assignee: Techno Dynamics Inc., Kikugawa-shi, Shizuoka (JP)

( * ) Notice: Subject to any disclaimer, the term of this patent is extended or adjusted under 35 U.S.C. 154(b) by 147 days.

(21) Appl. No.: 14/731,601

(22) Filed: Jun. 5, 2015

(65) Prior Publication Data

US 2015/0354642 A1 Dec. 10, 2015

(30) Foreign Application Priority Data

Jun. 5, 2014 (JP) .................................. 2014-116534

(51) Int. Cl.
*F16D 7/08* (2006.01)
*F16D 43/206* (2006.01)

(52) U.S. Cl.
CPC ............. *F16D 43/206* (2013.01); *F16D 7/08* (2013.01)

(58) Field of Classification Search
CPC ............... F16D 7/06; F16D 7/08; F16D 7/044
See application file for complete search history.

(56) References Cited

U.S. PATENT DOCUMENTS

| | | | | |
|---|---|---|---|---|
| 2,978,082 A | * | 4/1961 | Better ................... | B25B 23/141 192/56.5 |
| 3,893,553 A | * | 7/1975 | Hansen ................... | F16D 45/00 192/150 |
| 4,220,230 A | * | 9/1980 | Hansen ................. | F16D 43/206 192/56.57 |
| 5,005,684 A | * | 4/1991 | Fujii ......................... | F16D 7/08 192/56.57 |
| 5,820,465 A | * | 10/1998 | Vogl ........................ | F16D 7/046 192/56.57 |

FOREIGN PATENT DOCUMENTS

| | | |
|---|---|---|
| JP | S64003130 U | 1/1989 |
| JP | H02122221 U | 10/1990 |
| JP | 11-093970 A | 4/1999 |

OTHER PUBLICATIONS

Japanese Notification of Reasons for Refusal dated Dec. 26, 2016, corresponding to Japanese Patent Application No. 2014-116534 (with English Translation).

* cited by examiner

*Primary Examiner* — Jacob S Scott
*Assistant Examiner* — Lillian Nguyen
(74) *Attorney, Agent, or Firm* — Harness, Dickey & Pierce, P.L.C.

(57) ABSTRACT

An overload limiting device includes: a rolling element; a rotatable first rotation member having a housing portion that houses the rolling element; a rotatable second rotation member having an engagement recess portion that engages detachably with the rolling element housed in the housing portion, the second rotation member being arranged opposing the first rotation member; a biasing member that biases the rolling element toward the engagement recess portion; and an adjustment nut that adjusts a biasing force of the biasing member by moving in a rotation axis direction of the first rotation member, the adjustment nut being provided to the first rotation member, the first rotation member including a scale showing a position of the adjustment nut in the rotation axis direction.

7 Claims, 10 Drawing Sheets

ROTATION AXIS DIRECTION

ROTATION AXIS DIRECTION

ROTATION AXIS DIRECTION

FIG. 3

ROTATION AXIS DIRECTION

ROTATION AXIS DIRECTION

OVERLOAD LIMITING DEVICE

CROSS-REFERENCE TO RELATED APPLICATIONS

The present application claims priority upon Japanese Patent Application No. 2014-116534 filed on Jun. 5, 2014, which is herein incorporated by reference.

BACKGROUND

Technical Field

The present invention relates to overload limiting devices.

Related Art

An overload limiting device including: rolling element; rotatable first rotation member having a housing portion that houses the rolling element; rotatable second rotation member having an engagement recess portion that engages detachably with the rolling element housed in the housing portion, the second rotation member being arranged opposing the first rotation member; and a biasing member that biases the rolling element toward the engagement recess portion is already well known.

Such an overload limiting device is, for example, provided between an input side member and an output side member, and connected to both members. The overload limiting device usually transfers torque of the input side member to the output side member. In the case that the input side member is overloaded, however, the overload limiting device limits the torque transmission, and has a function of preventing damage from occurring to the output side member.

By the way, of the above described overload limiting devices, there is a device in which a biasing force of a biasing member is adjusted and thus a limiting torque value can be adjusted, and the device is provided with an adjustment nut as a member to adjust the biasing force.

This adjustment nut is provided to a first rotation member, and moves in a rotation axis direction of the first rotation member and thus adjusts the biasing force of the biasing member. Then, in this way, the limiting torque value is to be adjusted (JP-A-11-93970).

Conventionally, an appropriate measure to recognize the position of the adjustment nut in the rotation axis direction was not provided to the overload limiting device. Thus, there was a problem of inconvenience during the adjusting of the limiting torque value (non-adjustable).

SUMMARY

An advantage of some aspects of the present invention is that it is possible to achieve an overload limiting device in which a limiting torque value can be easily adjusted.

An aspect of the invention is an overload limiting device including:

a rolling element;

a rotatable first rotation member having a housing portion that houses the rolling element;

a rotatable second rotation member having an engagement recess portion that engages detachably with the rolling element housed in the housing portion, the second rotation member being arranged opposing the first rotation member;

a biasing member that biases the rolling element toward the engagement recess portion; and an adjustment nut that adjusts a biasing force of the biasing member by moving in a rotation axis direction of the first rotation member, the adjustment nut being provided to the first rotation member, the first rotation member including a scale showing a position of the adjustment nut in the rotation axis direction.

Other features of the present invention will be made clear through the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DESCRIPTION OF EXEMPLARY EMBODIMENTS

At least the following matters will become clear through the description of the present specification and the accompanying drawings.

An overload limiting device comprising:

a rolling element;

a rotatable first rotation member having a housing portion that houses the rolling element;

a rotatable second rotation member having an engagement recess portion that engages detachably with the rolling element housed in the housing portion, the second rotation member being arranged opposing the first rotation member;

a biasing member that biases the rolling element toward the engagement recess portion; and an adjustment nut that adjusts a biasing force of the biasing member by moving in a rotation axis direction of the first rotation member, the adjustment nut being provided to the first rotation member, the first rotation member including a scale showing a position of the adjustment nut in the rotation axis direction.

In such a case, the overload limiting device in which the limiting torque value can be simply adjustment can be realized.

Further, the scale may be a groove formed in the first rotation member.

In such a case, during manufacturing of the first rotation member, the scales can be formed while processing other shapes.

Further, a scale line configuring the scale may be formed in a circumferential direction on a circumferential surface of the first rotation member, and a plurality of the scale lines may be provided aligned at equal intervals in the rotation axis direction, the adjustment nut may be formed with male threads, and the first rotation member may be formed with female threads, and the scale lines may be formed so that a scale spacing of the scale matches a thread pitch.

In such a case, the adjustment of the limiting torque value can be performed more simply.

Further, a scale line configuring the scale may be formed in a circumferential direction on a circumferential surface of the first rotation member, and a plurality of the scale lines may be provided aligned at equal intervals in the rotation axis direction, the biasing member may be in contact with a tip end portion in the rotation axis direction of the adjustment nut, and a rear end portion in the rotation axis direction of the adjustment nut may be positioned in a position corresponding to the scale.

In such a case, the scale can be made readable.

Further, the rear end portion may be provided with a notch having a notch length longer than the scale spacing in the rotation axis direction.

In such a case, the adjustment of the limiting torque value can be performed more simply.

Further, two of the notches may be provided in a 180-degree interval in a circumferential direction of the adjustment nut.

In such a case, the limiting torque value can be adjusted more simply.

Further, a thickness in a radial direction of the adjustment nut in a peripheral edge portion of the notch may be thinner than a thickness in a radial direction of the adjustment nut in a non-peripheral edge portion.

In such a case, the limiting torque value can be adjusted more simply.

Further, the peripheral edge portion may be applied with a color different from the non-peripheral edge portion.

In such a case, the limiting torque value can be adjusted more simply.

Further, the overload limiting device may include a first peripheral edge portion adjacent to the notch in the rotation axis direction;

a first non-peripheral edge portion adjacent to the first peripheral edge portion in the rotation axis direction; and a second non-peripheral edge portion adjacent to the first non-peripheral edge portion in the rotation axis direction, wherein a thickness in a radial direction of the adjustment nut in the first peripheral edge portion may be thinner than a thickness in a radial direction of the adjustment nut in the first non-peripheral edge portion, and the thickness in the radial direction of the adjustment nut in the first non-peripheral edge portion may be thinner than a thickness in a radial direction of the adjustment nut in the second non-peripheral edge portion.

In such a case, manufacturing of the overload limiting device can be performed appropriately, and the limiting torque value can be adjusted more simply.

===Regarding Torque Limiter 10===

Figure 1:
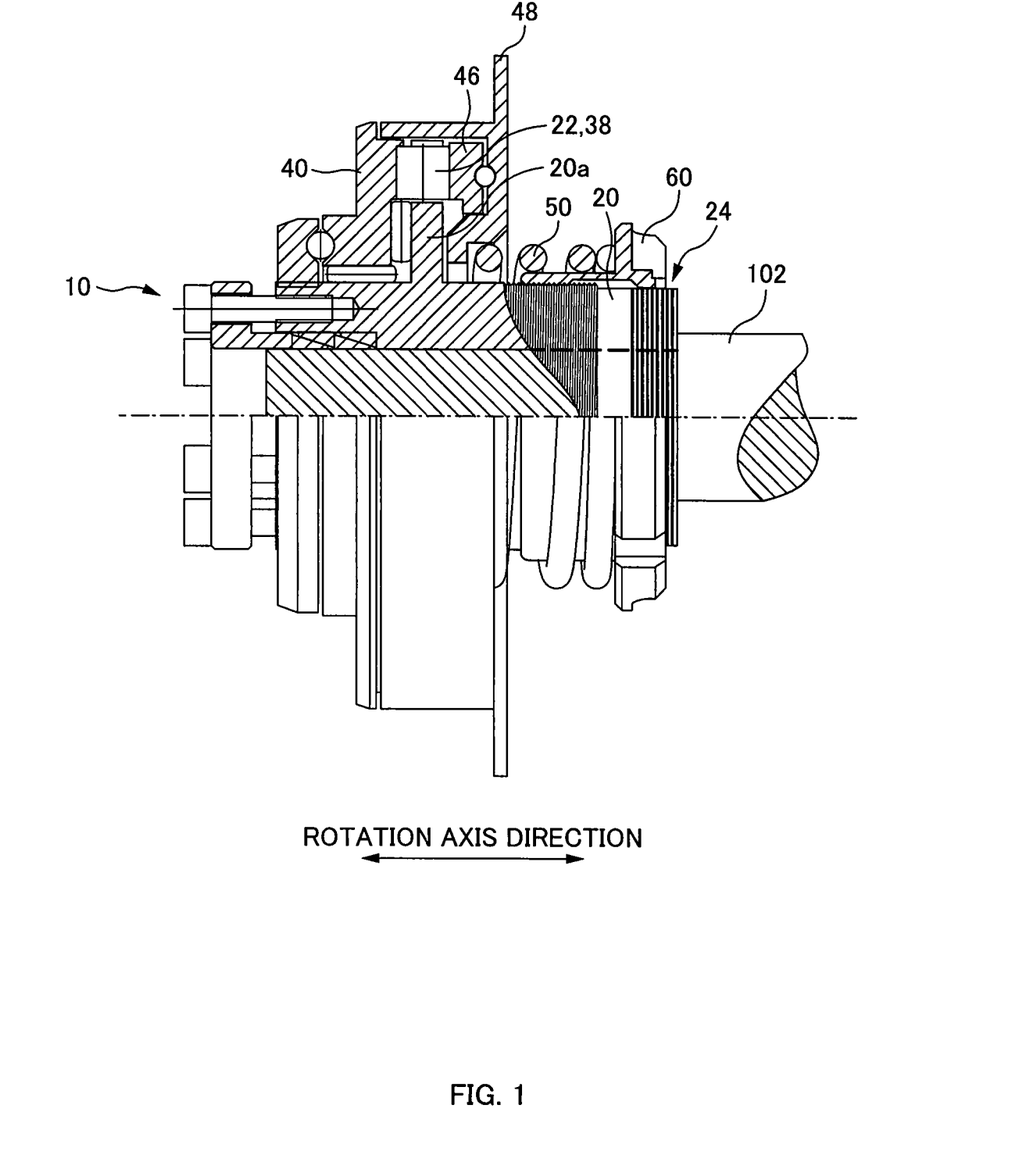
FIG. 1 is an overall view of a torque limiter 10.
Figure 2:
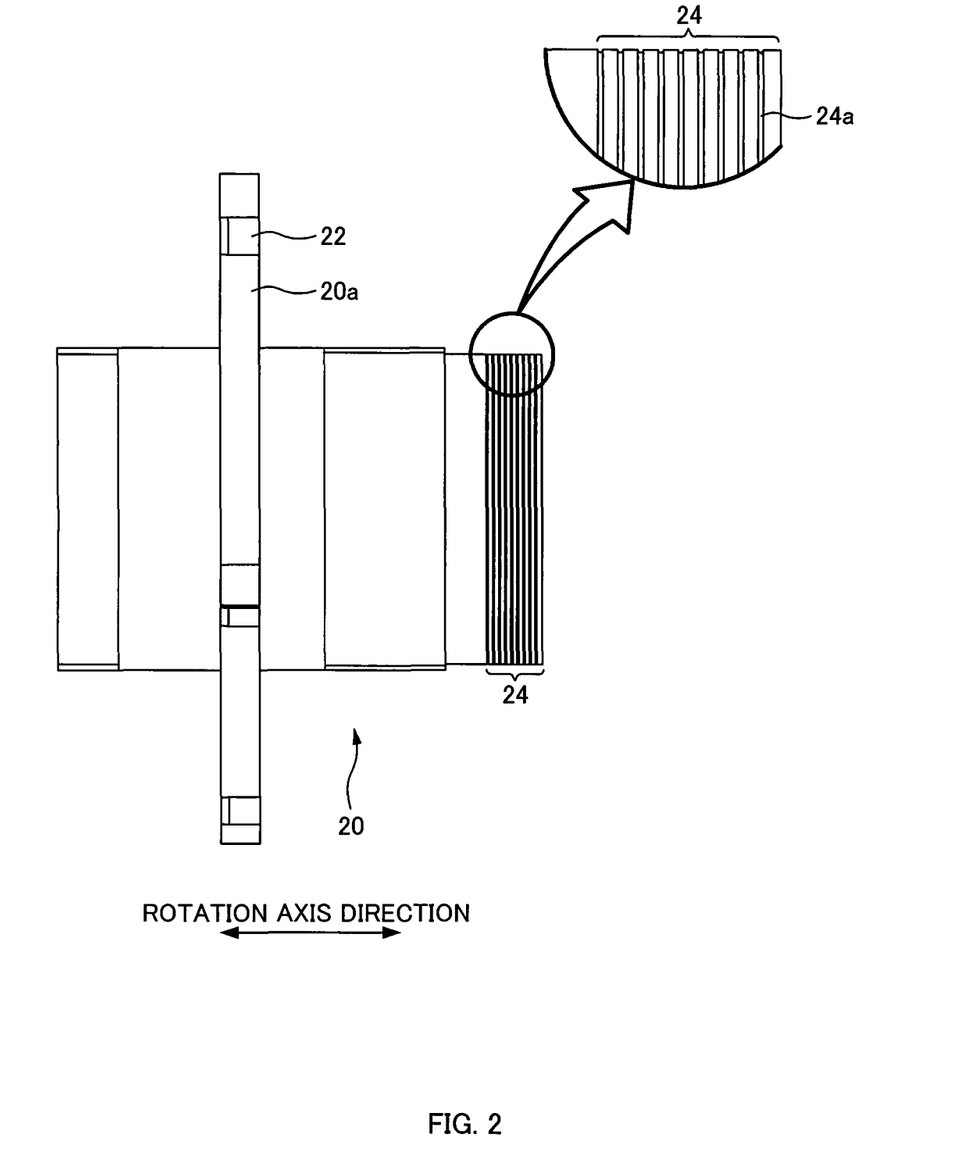
FIG. 2 is an overall view of an input transmission member 20.
Figure 3:
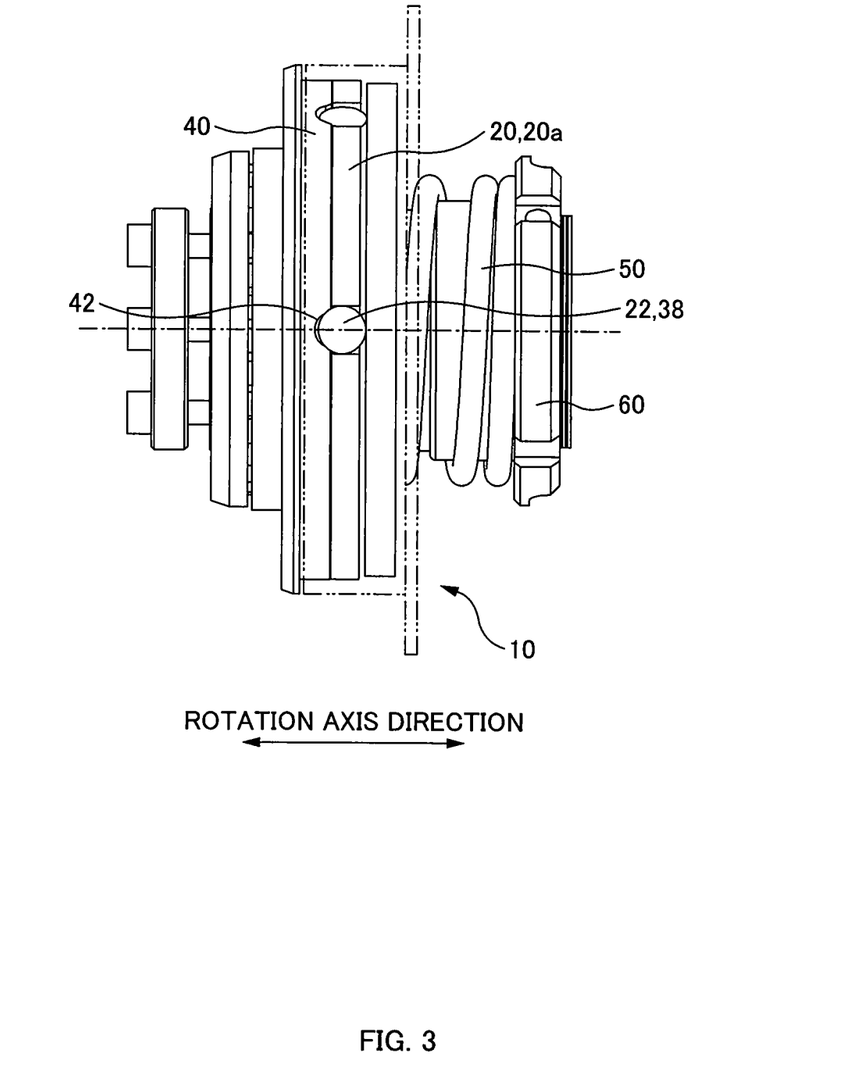
FIG. 3 is an explanatory view for explaining a torque transmission state of the torque limiter 10.
Figure 4:
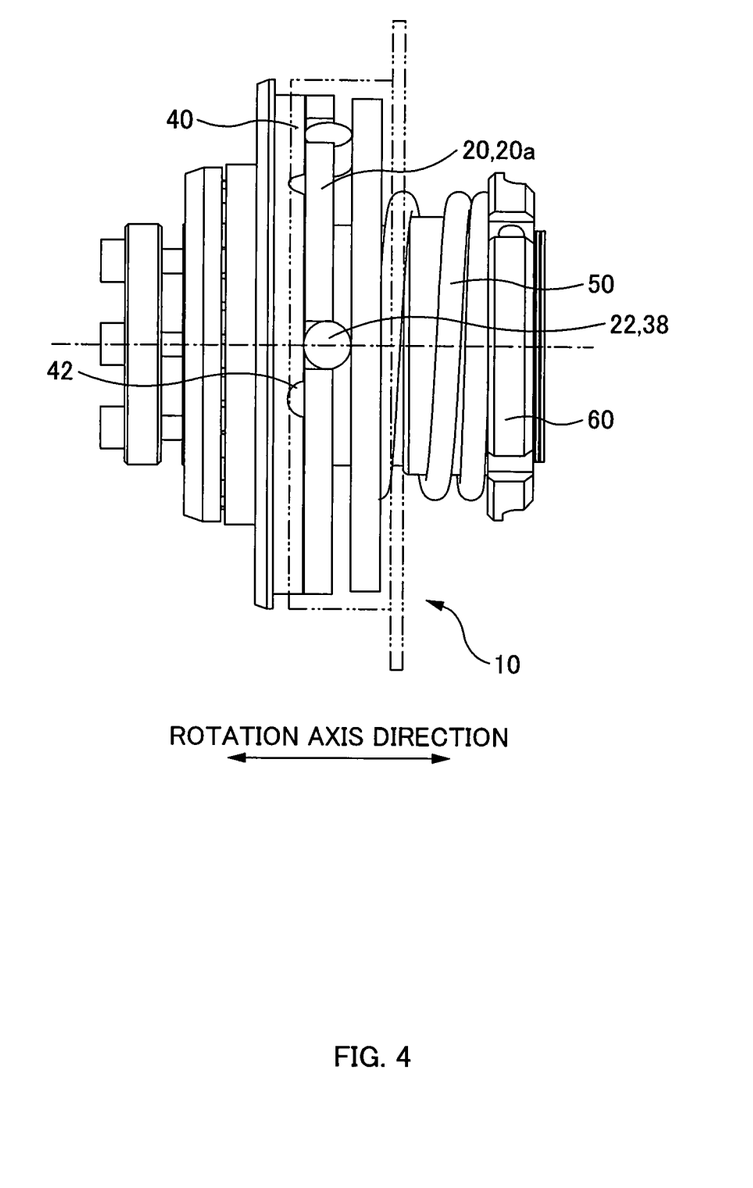
FIG. 4 is an explanatory view for explaining a torque limiting state of the torque limiter 10.
Figure 5:
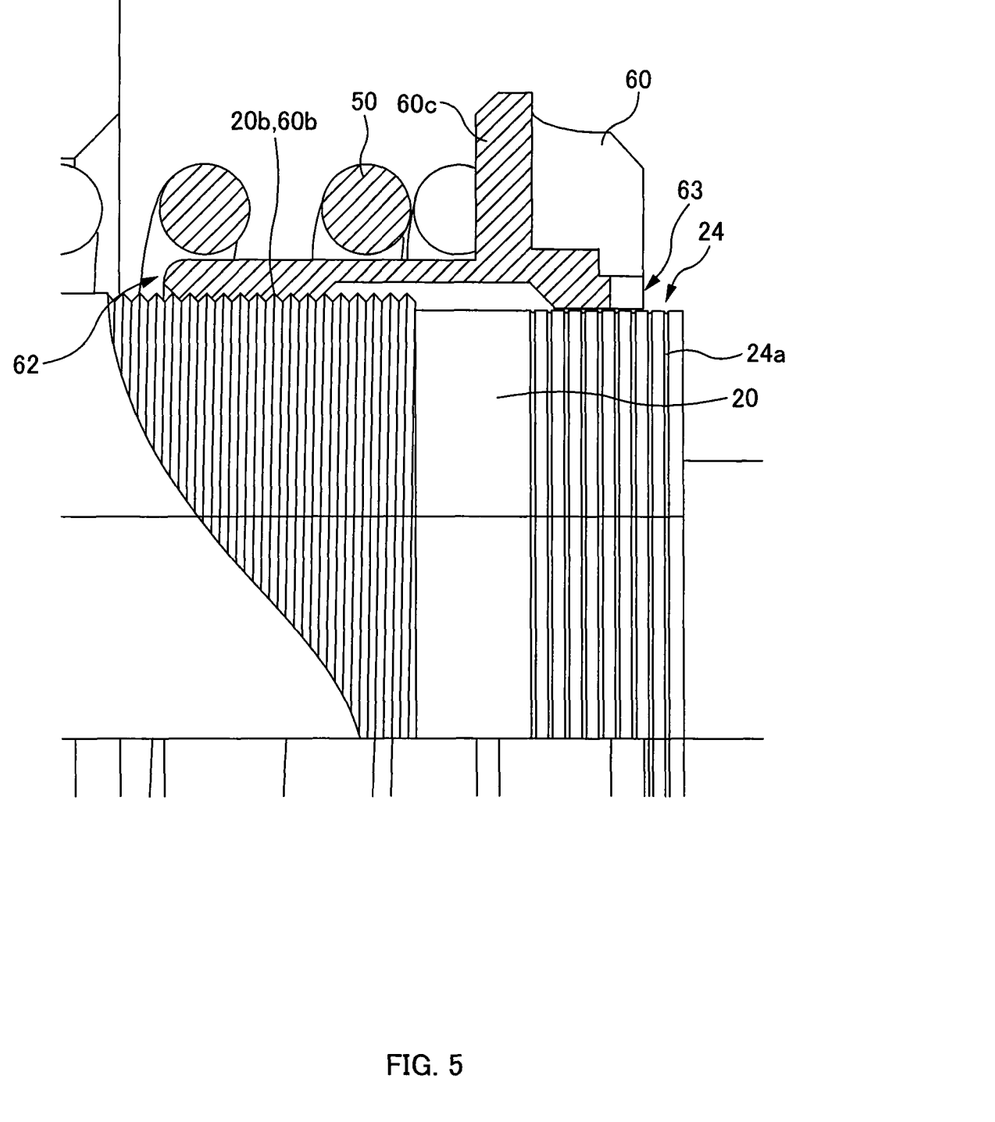
FIG. 5 is a partially enlarged view showing a periphery of an adjustment nut 60 in FIG. 1 that has been enlarged.
Figure 6:
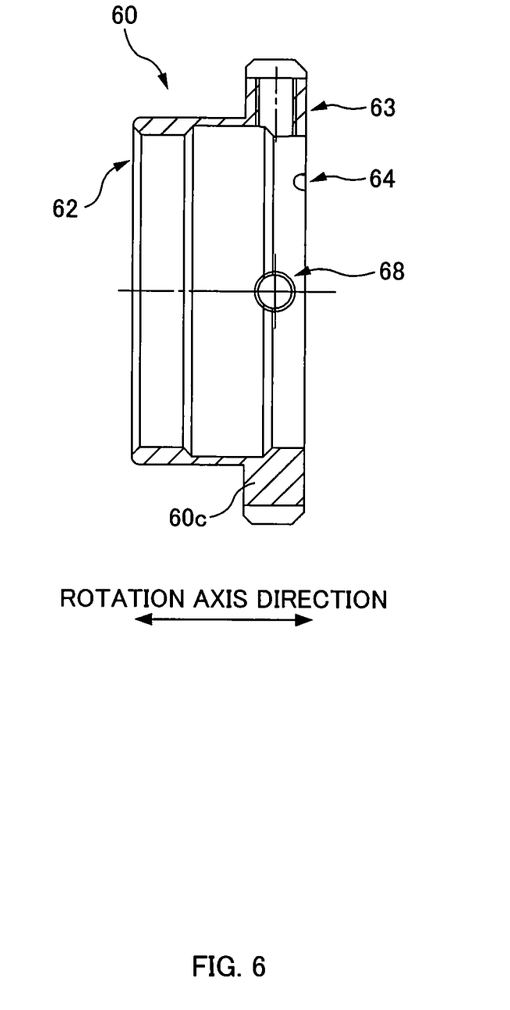
FIG. 6 is a sectional view of the adjustment nut 60.

Here, a torque limiter 10 that is an example of an overload limiting device is described with reference to FIG. 1 to FIG. 10. FIG. 1 is an overall view of the torque limiter 10. FIG. 2 is an overall view of an input transmission member 20. FIG. 3 is an explanatory view for explaining a torque transmission state of the torque limiter 10. FIG. 4 is an explanatory view for explaining a torque limiting state of the torque limiter 10. FIG. 5 is a partially enlarged view showing the periphery of an adjustment nut 60 that has been enlarged. FIG. 6 is a sectional view of the adjustment nut 60.

Figure 7:
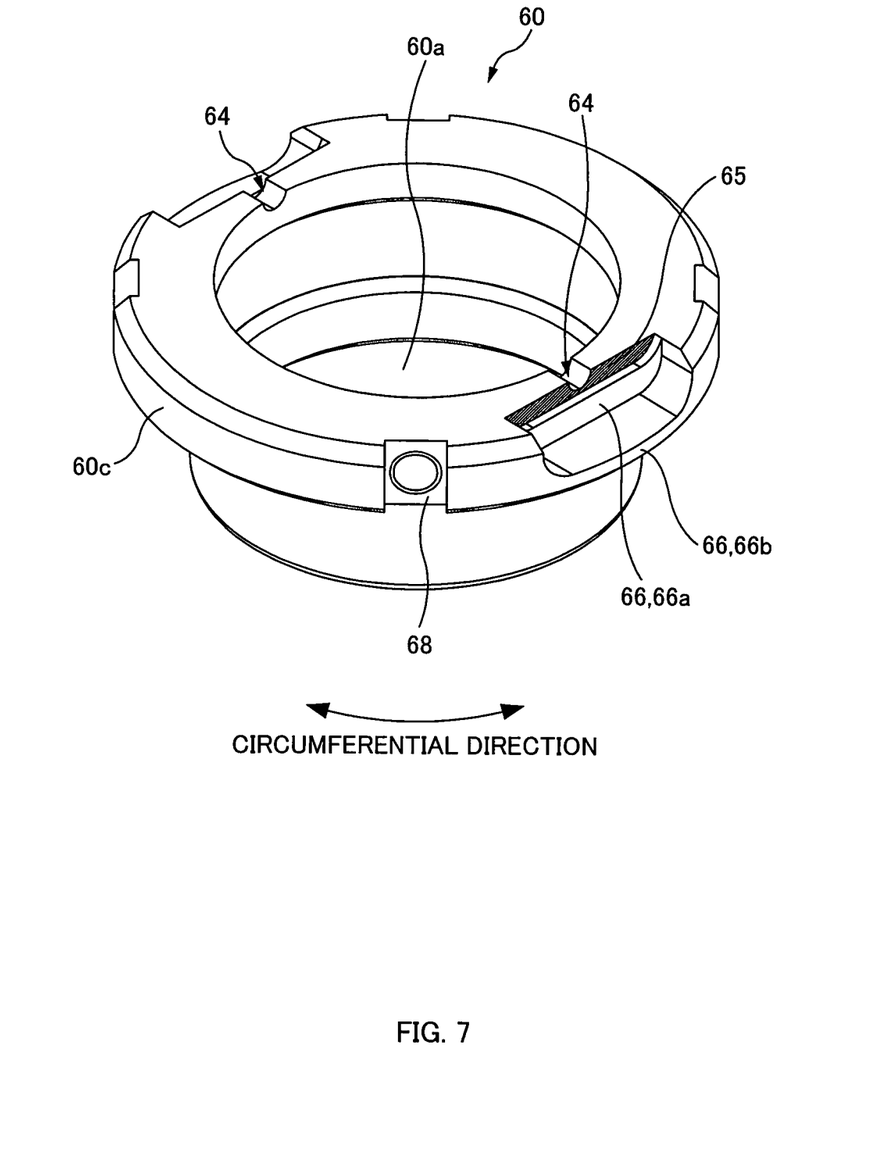
FIG. 7 is a perspective view of the adjustment nut 60.
Figure 8:
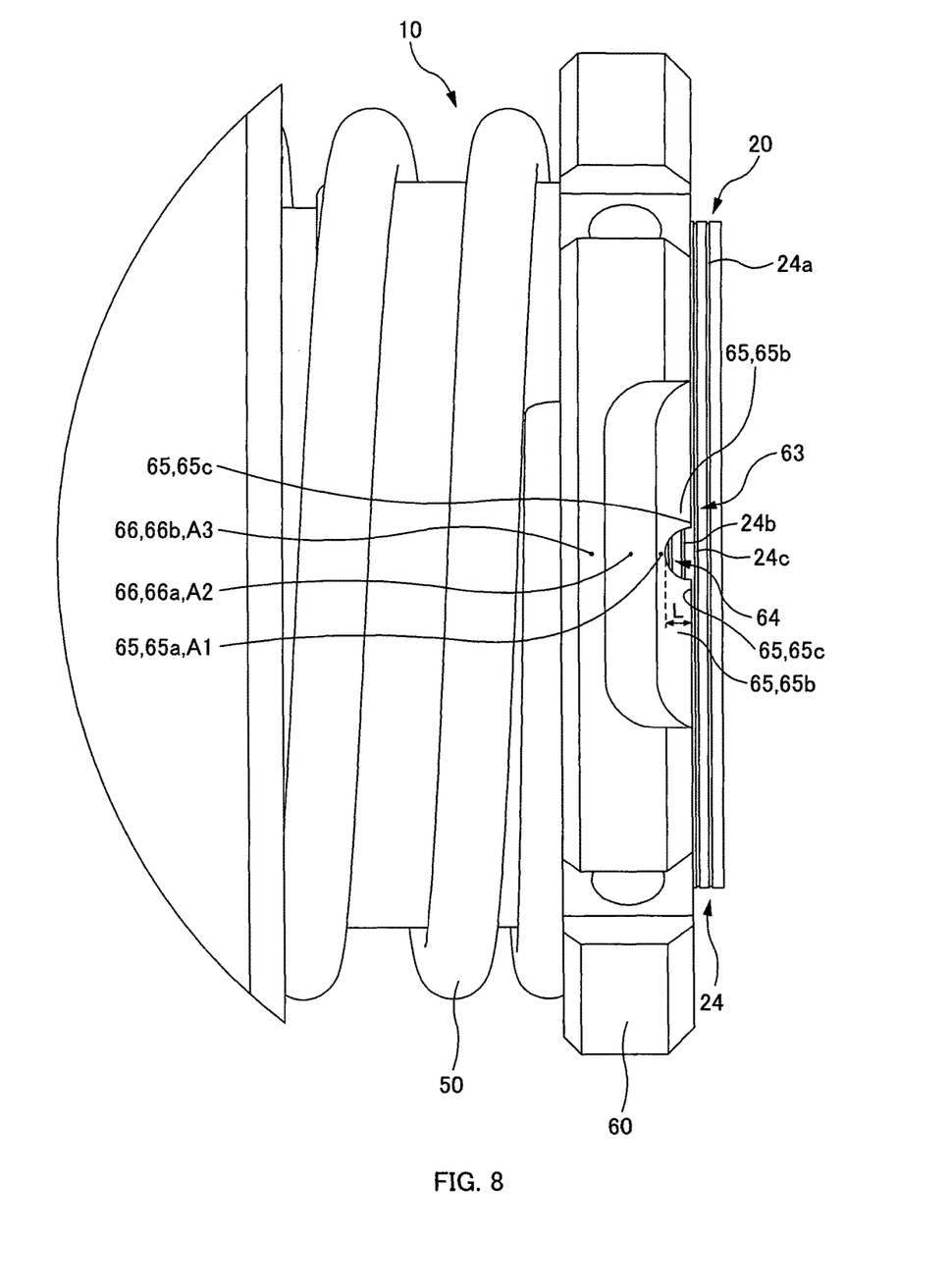
FIG. 8 is an enlarged view of a scale 24 provided to the input transmission member 20 and a periphery of the scale 24.
Figure 9:
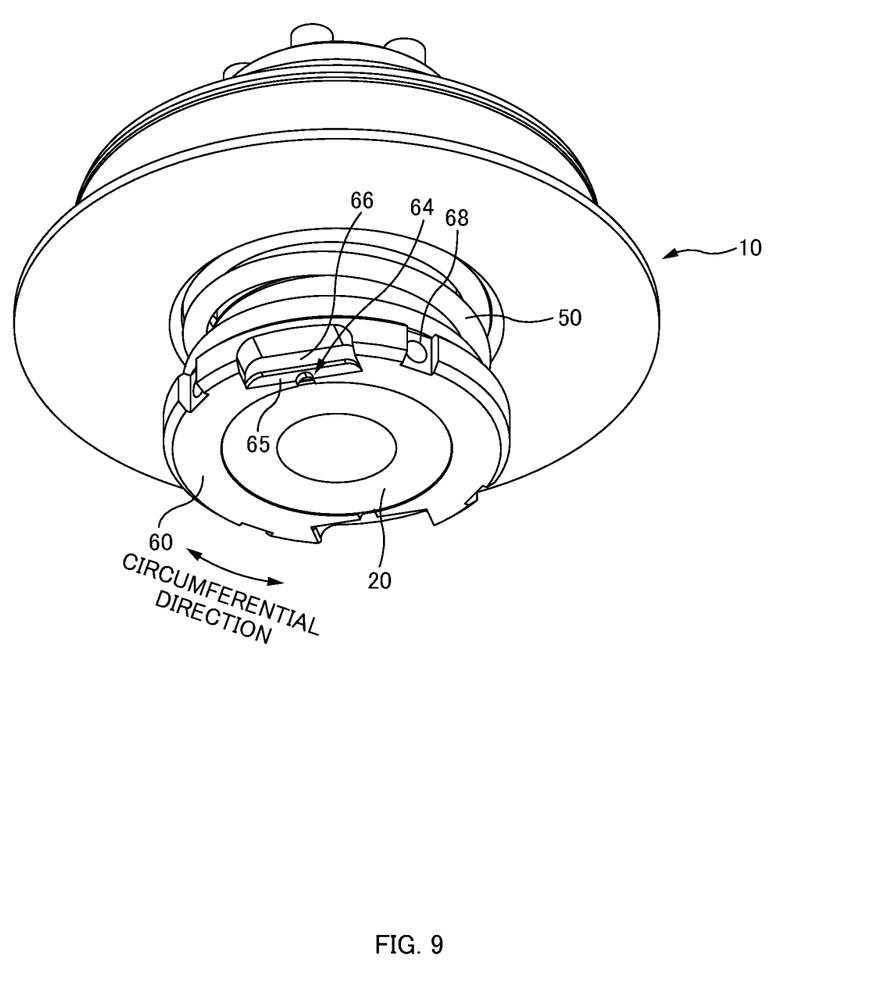
FIG. 9 is a perspective view showing a periphery of a notch 64 of the torque limiter 10.
Figure 10:
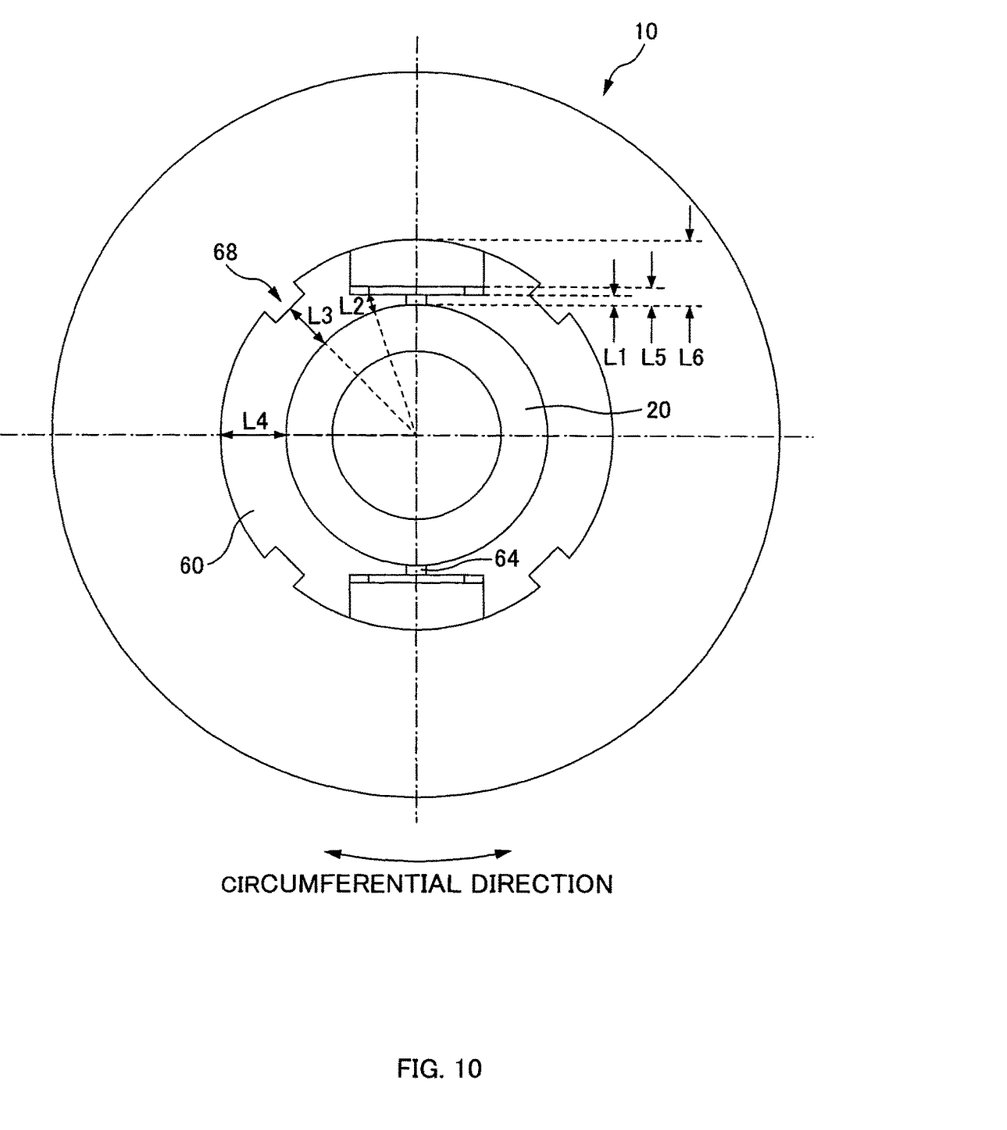
FIG. 10 is a view of the torque limiter 10 that is seen from a rear end side of the adjustment nut 60.

FIG. 7 is a perspective view of the adjustment nut 60. FIG. 8 is an enlarged view of a scale 24 provided to the input transmission member 20 and the periphery of the scale 24. FIG. 9 is a perspective view showing the periphery of a notch 64 of the torque limiter 10. FIG. 10 is a view of the torque limiter 10 that is seen from a rear end side of the adjustment nut 60.

Hereinbelow, first, the principle of operation of the torque limiter 10 is explained, and then following that, an adjustment mechanism of a limiting torque value (in other words, a torque value in the case where the torque limiter 10 shifts from a torque transmission state to a torque limiting state) is described. Furthermore, a measure to recognize the position of the adjustment nut 60 configuring this adjustment mechanism and merits thereof will be explained.

<<<Regarding Principle of Operation of Torque Limiter 10>>>

The torque limiter 10 is provided between a rotation member to an input side (an input side member) and a rotation member to an output side (an output side member), and the torque limiter is connected to both members. The torque limiter 10 usually transfers torque of the input side member to the output side member. In the case that the input side member is overloaded, however, the torque limiter 10 limits the torque transmission and has the function of preventing damage from occurring to the output side member.

The torque limiter 10 according to this embodiment mode has a columnar input transmission member 20 as an example of a rotatable first rotation member and an output flange 40 as an example of a rotatable second rotation member, as shown in FIG. 1 and FIG. 2, and an input axis 102 as an input side member is connected to the input transmission member 20, and an output axis (not shown) as an output side member is connected to the output flange 40. The output flange 40 is arranged opposed and coaxial with the input transmission member 20 and is relatively rotatable in respect to the input transmission member 20.

The input transmission member 20 is provided with a collar portion 20a (refer to FIG. 2), and this collar portion 20a is provided with a plurality of (five, in this embodiment mode) housing portions 22 each for housing a rolling element 38 along a circumferential direction of the collar portion 20a. Each of the housing portions 22 houses the rolling element 38.

On the other hand, in each corresponding position of the five housing portions 22, the output flange 40 is provided with an engagement recess portion 42 that engages engageably and detachably with the rolling element 38 housed in the housing portion 22 (refer to FIG. 3 and FIG. 4). Then, in the case where the rolling elements 38 are engaged with the engagement recess portions 42, the torque is transferred from the input transmission member 20 to the output flange 40.

Further, the rolling element 38 is biased toward the engagement recess portion 42, with a spring member 50 as an example of a biasing member. Specifically, as shown in FIG. 1, in between the rolling element 38 and the spring member 50, there are provided a rolling element retaining ring 46 that contacts directly with the rolling element 38 and a rolling element compression member 48 connected to the rolling element retaining ring 46 via a bearing. Then, in the case where the spring member 50 biases the rolling element compression member 48, such biasing force is transferred to the rolling element retaining ring 46 and the rolling element 38, and the rolling element 38 is pressed against the engagement recess portion 42. In other words, the spring member 50 biases the rolling element 38 toward the engagement recess portion 42, via the rolling element retaining ring 46 and the rolling element compression member 48. It should be noted that, the spring member 50 is wound around a peripheral surface of the input transmission member 20, and an expansion and contraction direction of the input transmission member 20 is along a rotation axis direction of the input transmission member 20.

In the torque limiter 10 configured in this way, as shown in FIG. 3, normally (in normal drive), the rolling elements 38 housed in the housing portions 22 are engaged with the engagement recess portions 42, and the input transmission member 20 and the output flange 40 rotate integrally. In other words, the torque of the input transmission member 20 is transferred to the output flange 40.

In the case where the input side member is overloaded, however, the torque of the input transmission member 20 becomes excessive, thus the rolling elements 38 housed in the housing portions 22 drop out of (detach from) the engagement recess portions 42, as shown in FIG. 4. For this reason, the torque transmission from the input transmission member 20 to the output flange 40 is limited, and it becomes possible to prevent damage from occurring to the output side member in advance.

<<<Regarding Adjustment Mechanism of Limiting Torque Value of Torque Limiter 10>>>

In this embodiment mode, by adjusting the biasing force of the spring member 50, the limiting torque value can be adjusted. In other words, in the case where the spring member 50 is compressed and the biasing force is made large, then the rolling element 38 will be pressed against the engagement recess portion 42 with a greater force, and thus the torque transmission will be non-limitable. In such a case, the limiting torque value will have a larger value.

On the other hand, in the case where the spring member 50 is extended and the biasing force is made small, the rolling element 38 is to be pressed against the engagement recess portion 42 with a smaller force, thus the torque transmission will be limitable. In this case, the limiting torque value will have a smaller value.

The torque limiter 10 according to this embodiment mode is provided with the adjustment nut 60 as the member for adjusting this biasing force.

This adjustment nut 60 is provided to the input transmission member 20. In other words, the adjustment nut 60 is provided with a fitting hole 60a, and the adjustment nut is fitted to the input transmission member 20. Then, as shown in FIG. 5, the adjustment nut 60 is formed with female threads 60b and the input transmission member 20 is formed with male threads 20b, and by turning the adjustment nut 60, the adjustment nut 60 can be moved in a rotation axis direction of the input transmission member 20.

Further, as shown in FIG. 6 and FIG. 7, the adjustment nut 60 is provided with a collar portion 60c, and the spring member 50 is in contact with (is wound around) the adjustment nut 60 from the collar portion 60c over to a tip end portion 62 in the rotation axis direction of the adjustment nut 60. The collar portion 60c is pressing the spring member 50 in a state contacting the spring member 50. Thus, by tightening the adjustment nut 60, in the case where the adjustment nut 60 moves in a direction closer to the collar portion 20a (in FIG. 5, a direction from the right toward the left), the spring member 50 is compressed, and the biasing force, namely, the limiting torque value becomes a greater value. On the other hand, by loosening the adjustment nut 60, in the case where the adjustment nut 60 moves in a direction away from the collar portion 20a (in FIG. 5, in a direction from the left toward the right), the spring member 50 is extended, and the biasing force, namely, the limiting torque value becomes a smaller value.

In this way, the limiting torque value (the biasing force) differs, depending on the position of the adjustment nut 60 in the rotation axis direction of the input transmission member 20 (in other words, a relative position in respect to the input transmission member 20). Thus, the adjustment nut 60 is a member that adjusts the limiting torque value (the biasing force) by moving in the rotation axis direction of the input transmission member 20.

<<<Regarding a Measure to Recognize Position of the Adjustment Nut 60>>>

By the way, at the time an adjuster performs adjusting of the limiting torque value, in the case that the adjuster can accurately recognize a position of the adjustment nut 60 in the rotation axis direction (for example, a relative position in respect to the input transmission member 20), the adjuster's convenience can be increased.

For example, in the case where the position (relative position) of the adjustment nut 60 before changing the limiting torque value is noted, then after changing the limiting torque value by moving the adjustment nut 60, the value is to be returned to the original limiting torque value, the value can be smoothly returned to the original value. Further, in the case where a corresponding relationship between the limiting torque values and the positions (relative positions) of the adjustment nut 60 are known in advance (for example, in the case where a corresponding chart of the limiting torque values and the positions (relative positions) of the adjustment nut 60 is prepared), then the adjustment nut can be easily set a desired limiting torque value.

Conventionally, however, an appropriate measure to recognize the position (the relative position) of the adjustment nut was not provided to the torque limiter (In order to recognize the position, such as a ruler needed to be separately prepared). For this reason, there was a problem that it was inconvenient when adjusting the limiting torque value (it was difficult to adjust).

On the contrary, the torque limiter 10 in this embodiment mode has an appropriate measure to recognize the position (the relative position) of the adjustment nut 60. In other words, as shown in FIG. 2, FIG. 5, and FIG. 8, the input transmission member 20 is provided with the scale 24 to show the position (relative position) of the adjustment nut 60 in the rotation axis direction.

For this reason, the adjuster can accurately recognize the position (relative position) of the adjustment nut 60 with the scale 24, and thus the limiting torque value can be simply adjusted.

For example, in the case where the position (relative position) of the adjustment nut 60 before changing the limiting torque value is recognized and remembered with the scale 24, then in the case where after changing the limiting torque value by moving the adjustment nut 60, the value is to be returned to the original limiting torque value, then by matching the adjustment nut 60 to the remembered position using the scale 24, the value can be smoothly returned to the original value.

Further, in the case where a corresponding relationship between the limiting torque values and the positions (relative positions) of the adjustment nut 60 are known in advance, then using the scale 24, the adjustment nut 60 is matched to the position (relative position) of the adjustment nut 60 corresponding to the desired limiting torque value, and thus the adjustment nut can be easily set to the desired limiting torque value.

In this way, according to this embodiment mode, the torque limiter 10 that can simply adjust the limiting torque value can be achieved.

Hereafter, the scale 24 and peripheral configurations of the scale 24 are explained in detail. This scale 24 is a groove formed to the input transmission member 20. In other words, as shown in the enlarged view of FIG. 2, the scale 24 is formed by digging the groove to the input transmission member 20. Thus, during manufacturing of the input transmission member 20 with a lathe or the like, the scale 24 can be formed during processing of other shapes.

Further, as shown in FIG. 2, FIG. 5, and FIG. 8, scale lines 24a (namely, each one of the grooves) configuring the scale 24 is formed in a circumferential direction on a peripheral surface of the input transmission member 20, and further the plurality of the scale lines 24a are provided aligned in equal intervals in the rotation axis direction of the input transmission member 20. As described above, the adjustment nut 60 is formed with the female threads 60b and the input transmission member 20 is formed with the male threads 20b, and the scale lines 24a are formed so that, as shown in FIG. 5, the thread pitch and the scale spacing of the scale 24 (namely, the interval between the adjacent scales) match. Therefore, in the case where the adjuster turns the adjustment nut 60 to rotate once, the adjustment nut 60 moves by one scale, and in the case where the adjuster turns the adjustment nut 60 180 degrees, the adjustment nut 60 moves by half of the scale. Thus, the placing of the scale lines 24a can be easily understood by the adjuster. Thus, the limiting torque value can be further simply adjusted.

Further, as described above, the spring member 50 is in contact with the front end portion 62 of the adjustment nut 60 in the rotation axis direction, and as shown in FIG. 8, the rear end portion 63 of the adjustment nut 60 in the rotation axis direction is positioned in a position corresponding to the scale 24. It is possible to consider positioning the front end portion 62 in a position corresponding to the scale 24, but in such a case the spring member 50 will overlap with the scale 24, and the scale 24 may be difficult to see. Thus, in order to make the scales 24 easy to see, the rear end portion 63 is to be positioned in the position corresponding to the scale 24.

Further, the rear end portion 63 of the adjustment nut 60 is provided with a notch 64 notched from the rear end portion 63 toward the front end portion 62. The reason that this notch 64 was provided is as follows.

In other words, during the adjusting of the limiting torque value, there is a case where the adjuster matches the rear end portion 63 to the scale lines 24a of the scale 24. In some cases, however, the rear end portion 63 is not matched to the scale lines 24a themselves, but is to be matched in between two adjacent scale lines 24a (these two scale lines 24a are a front end side scale line 24b and a rear end side scale line 24c) (In FIG. 8, such a situation is shown). As one example, there is a case where the rear end portion 63 is to be matched right in the middle of the two adjacent scale lines 24a.

In such a case, supposing that the notch 64 is not provided, as can be easily understood from FIG. 8, the rear end side scale line 24c can be visually checked but the front end side scale line 24b is hidden to the back side of the adjustment nut 60, thus it is difficult for the adjuster to determine where the center is.

On the contrary, in this embodiment mode, as shown in FIG. 8, the notch 64 is provided, and the scale lines 24a can be visually checked through this notch 64 (the notch 64 that enables visual checking of the scale lines 24a is provided). Further, a notch length L in the rotation axis direction of this notch 64 is longer than the scale spacing. Thus, when matching the rear end portion 63 in between the two adjacent scale lines 24a, the two adjacent scale lines 24a can be definitely visually checked. Thus, the limiting torque value can be further simply adjusted.

Further, as shown in FIG. 7, two of the notches 64 are provided with a 180 degree interval, in the circumferential direction of the adjustment nut 60. Thus, the following merits may occur.

The rear end portion 63 has a part provided with the notch 64 (For the sake of convenience, referred to as a notch setting portion. This portion includes a rear end portion adjacent to the notch 64 in the circumferential direction (Referred to as an adjacent rear end portion 65c. Refer to FIG. 8.).) and a part away from the notch 64 (For the sake of convenience, referred to as a notch-non-setting portion.). At this time, the notch-non-setting portion may be matched with the scale lines 24a, but matching the notch setting portion to the scale lines 24a makes adjustment simpler, as described above. Thus, the adjuster will focus on the notch setting portion, when adjusting the limiting torque value.

On the other hand, in the case where the torque limiter 10 is placed in a small space or the like, a situation may occur where a front side of the rear end portion 63 of the adjustment nut 60 can be seen by the adjuster, but a back side cannot be seen. Then, in this embodiment mode, two of the notches 64 are provided in a 180 degrees interval in the circumferential direction of the adjustment nut 60, thus even in such a situation, the limiting torque value can be adjusted using the notch setting portion. Thus, the limiting torque value can be adjusted further simply.

Next, focusing on a peripheral edge portion 65 of the notch 64 (this peripheral edge portion 65 can also be referred to as a solid part of the adjustment nut 60 that forms the notch 64 that is a space), in this embodiment mode, this peripheral edge portion 65 is a thin shape. In other words, as shown in FIG. 7, FIG. 9, and FIG. 10, a thickness in the radial direction of the adjustment nut 60 in a peripheral edge portion 65 of the notch 64 (for example, L1 and L2 in FIG. 10), is smaller than a thickness in the radial direction of the adjustment nut 60 in a non-peripheral edge portion 66 (for example, L3 and L4 in FIG. 10). It should be noted that, the reason for the above is as follows.

In the case where the peripheral edge portion 65 is a thick shape, the peripheral edge portion 65 is positioned in a higher position than the scale 24 in the thickness direction (the part formed with the scale 24 of the input transmission member). In such a situation, in the case where the adjuster sees the scale 24 from a slanting direction, the scale 24 may not be read accurately (there is no problem in the case where the adjuster sees the scale 24 from the front). Contrary to this, in this embodiment mode, the peripheral edge portion 65 is made as a thin shape and the peripheral edge portion 65 is placed as close as possible to the scale 24 in the thickness direction, so that such an inconvenience does not occur as much as possible. Thus, the limiting torque value can be further simply adjusted.

It should be noted that, as shown in FIG. 8, the peripheral edge portion 65 includes a first peripheral edge portion 65a adjacent to the notches 64 in the rotation axis direction, a second peripheral edge portion 65b adjacent to the notches 64 in the circumferential direction (includes the above described adjacent rear end portion 65c) and the like, and the thickness of each of the above is thinner than the thickness of the adjustment nut 60 in the non-peripheral edge portion 66.

Further, as shown in FIG. 7, the peripheral edge portion 65 is applied with a color different from the non-peripheral edge portion 66. In this embodiment mode, the peripheral edge portion 65 is applied with a marker in a red color. Therefore, even in the case where the torque limiter 10 is placed in a small space and is in a dimly lit situation or the like, the above described notch setting portion can be immediately identified, and the limiting torque value can be adjusted using the notch setting portion (in other words, using the adjacent rear end portion 65c). Thus, the limiting torque value can be further simply adjusted.

It should be noted that, as described above, the peripheral edge portion 65 includes the first peripheral edge portion 65a, the second peripheral edge portion 65b and the like, and in this embodiment mode, all of the peripheral edge portions 65 are applied with a color different from that of the non-peripheral edge portions 66.

Further, in the case where the thickness in the radial direction of the above described adjustment nut 60 (in other words, the height) is seen in a direction from the notch 64 from the rear end side to the front end side in the rotation axis direction, as shown in FIG. 7 and FIG. 8, the thickness is in a three level ascending step state. In other words, a first level A1 adjacent to the notch 64 in the rotation axis direction is the lowest (in other words, the thickness is the thinnest), a second level A2 adjacent to the first level A1 in the rotation axis direction is higher than the first level A1 (in other words, the thickness is thicker than the first level A1), and a third level A3 adjacent to the second level A2 in the rotation axis direction is higher than the second level A2 (in other words, the thickness is thicker than the second level A2).

Then, this first level A1 corresponds to the peripheral edge portion 65 applied with the red color as described above (In other words, the first peripheral edge portion 65a.) (The second level A2 and the third level A3 are the non-peripheral edge portions 66. In this embodiment mode, the second level A2 is the first non-peripheral edge portion 66a and the third level A3 is the second non-peripheral edge portion 66b.).

In other words, there are provided the first peripheral edge portion 65a adjacent to the notch 64 in the rotation axis direction, the first non-peripheral edge portion 66a adjacent to the first peripheral edge portion 65a in the rotation axis direction, and the second non-peripheral edge portion 66b adjacent to the first non-peripheral edge portion 66a in the rotation axis direction, and the thickness in the radial direction of the adjustment nut 60 in the first peripheral edge portion 65a (shown by L1, in FIG. 10) is thinner than the thickness in the radial direction of the adjustment nut 60 in the first non-peripheral edge portion 66a (shown by L5, in FIG. 10), and the thickness in the radial direction of the adjustment nut 60 in the first non-peripheral edge portion 66a is thinner than the thickness in the radial direction of the adjustment nut 60 in the second non-peripheral edge portion 66b (shown by L6, in FIG. 10). The reason that the thickness is in three levels in this way is as described below.

First, the reason that the thickness needs to be made thin (to be a thin shape) regarding the first level A1 (the first peripheral edge portion 65a) is as already described above. On the other hand, in regards to the third level A3 (the second non-peripheral edge portion 66b), in consideration of turning the adjustment nut 60 using a tool (for example, a hook wrench), the thickness needs to be made thick in order to ensure sufficient rigidity to the adjustment nut 60. In the case of having only these two levels, however (in other words, in the case where the thickness of the first non-peripheral edge portion 66a is the same as the thickness of the first peripheral edge portion 65a, and in the case where the thickness of the first non-peripheral edge portion 66a is the same thickness as the second non-peripheral edge portion 66b), the below inconveniences occur.

In other words, in the case where the thickness of the first non-peripheral edge portion 66a is the same as the thickness of the first peripheral edge portion 65a, essentially, it means that there is no first non-peripheral edge portion 66a, and the range of the first peripheral edge portion 65a widens. At this time, the range that is applied with a color expands, thus it would mean wasting paint, and paint unevenness will easily occur.

On the other hand, in the case of making the thickness of the first non-peripheral edge portion 66a the same as the thickness of the second non-peripheral edge portion 66b, the thickness of the second non-peripheral edge portion 66b needs to be made thick, thus the thickness of the first non-peripheral edge portion 66a naturally becomes thick. Then, in this case, the difference in level between the first peripheral edge portion 65a and the first non-peripheral edge portion 66a becomes extremely large. Thus, depending on the angle that the adjuster is seeing from, an inconvenience occurs in which the first peripheral edge portion 65a (and thus, the notch 64) is hidden with the non-peripheral edge portion 66a and cannot be seen.

On the contrary, in this embodiment mode, since the thicknesses are in three levels, these inconveniences can be suppressed from occurring. In other words, the manufacturing of the torque limiter 10 can be appropriately performed, and also the limiting torque value can be further simply adjusted.

It should be noted that, in the above, turning of the adjustment nut 60 using the hook wrench is described, and the adjustment nut 60 of this embodiment mode has hook recess portions 68 for hooking the hook wrench. As shown in FIG. 7 and FIG. 10, four of these hook recess portions 68 are provided in 90 degrees intervals, in the circumferential direction of the adjustment nut 60.

OTHER EMBODIMENT MODES

In the above, the overload limiting device and the like according to this invention has been described based on the above embodiment mode, and the above embodiment mode of the invention is to facilitate understanding of this invention, and does not limit the invention in any way. This invention may be modified and altered without departing from the scope thereof, and it is needless to say that this invention includes its equivalents.

It should be noted that, in the above embodiment mode, the shape of the notches 64 are semi-circular. It is not limited to this, however, and, for example, may be rectangular.

Further, in the above embodiment mode, as shown in FIG. 8, the width of the second peripheral edge portion 65b is significantly greater than the width of the first peripheral edge portion 65a. It is not limited to the above, however, and, for example, the width of both portions may be the same, or the width of the first peripheral edge portion 65a may be greater than the width of the second peripheral edge portion 65b.

What is claimed is:

1. An overload limiting device comprising:
a rolling element;
a rotatable first rotation member having a housing portion that houses the rolling element;
a rotatable second rotation member having an engagement recess portion that engages detachably with the rolling element housed in the housing portion, the second rotation member being arranged opposing the first rotation member;
a biasing member that biases the rolling element toward the engagement recess portion; and
an adjustment nut that adjusts a biasing force of the biasing member by moving in a rotation axis direction of the first rotation member, the adjustment nut being provided to the first rotation member,
the first rotation member including a scale showing a position of the adjustment nut in the rotation axis direction,
wherein a scale line configuring the scale is formed in a circumferential direction on a circumferential surface of the first rotation member, and a plurality of the scale lines are provided aligned at equal intervals in the rotation axis direction,
wherein the biasing member is in contact with a tip end portion in the rotation axis direction of the adjustment nut, and a rear end portion in the rotation axis direction of the adjustment nut is positioned in a position corresponding to the scale, and
wherein the rear end portion of the adjustment nut is provided with a notch having a notch length longer than a scale spacing of the scale in the rotation axis direction.

2. The overload limiting device according to claim 1, wherein
the scale is a groove formed in the first rotation member.

3. The overload limiting device according to claim 1, wherein
the scale line configuring the scale is formed in the circumferential direction on the circumferential surface of the first rotation member, and the plurality of the scale lines are provided aligned at equal intervals in the rotation axis direction
the adjustment nut is formed with male threads, and the first rotation member is formed with female threads, and
the scale lines are formed so that the scale spacing of the scale matches a thread pitch.

4. The overload limiting device according to claim 1, wherein
two of the notches are provided in a 180-degree interval in a circumferential direction of the adjustment nut.

5. The overload limiting device according to claim 1, wherein
a thickness in a radial direction of the adjustment nut in a peripheral edge portion of the notch is thinner than a thickness in a radial direction of the adjustment nut in a non-peripheral edge portion.

6. The overload limiting device according to claim 5, wherein
the peripheral edge portion is applied with a color different from the non-peripheral edge portion.

7. The overload limiting device according to claim 6, comprising:
a first peripheral edge portion adjacent to the notch in the rotation axis direction;
a first non-peripheral edge portion adjacent to the first peripheral edge portion in the rotation axis direction; and
a second non-peripheral edge portion adjacent to the first non-peripheral edge portion in the rotation axis direction,
wherein a thickness in a radial direction of the adjustment nut in the first peripheral edge portion is thinner than a thickness in a radial direction of the adjustment nut in the first non-peripheral edge portion, and
the thickness in the radial direction of the adjustment nut in the first non-peripheral edge portion is thinner than a thickness in a radial direction of the adjustment nut in the second non-peripheral edge portion.

* * * * *